United States Patent
Tsubaki et al.

(10) Patent No.: US 6,305,599 B2
(45) Date of Patent: Oct. 23, 2001

(54) REUSABLE ASSEMBLED BOX AND METHOD OF TRANSPORT THEREOF

(75) Inventors: Masami Tsubaki; Hideki Iino, both of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/764,951

(22) Filed: Jan. 17, 2001

(30) Foreign Application Priority Data

Jan. 19, 2000 (JP) .................................................. 12-009695

(51) Int. Cl.[7] ....................................................... B65D 5/32
(52) U.S. Cl. .................................. 229/122.23; 229/198.1; 229/918; 493/311
(58) Field of Search ........................... 229/122.23, 198.1, 229/915, 918; 206/509, 511, 512; 493/311

(56) References Cited

U.S. PATENT DOCUMENTS

| | | | | |
|---|---|---|---|---|
| 2,921,729 | * | 1/1960 | Alger et al. | 229/122.23 |
| 3,004,695 | * | 10/1961 | Foss | 229/198.1 |
| 3,223,309 | * | 12/1965 | Chiorri | 229/198.1 |
| 3,669,339 | * | 6/1972 | Schilling | 229/122.23 |
| 3,738,562 | * | 6/1973 | Schwarz | 229/122.23 |
| 4,449,662 | * | 5/1984 | Okamura et al. | 229/198.1 |
| 4,619,365 | * | 10/1986 | Kelly et al. | 229/915 |
| 4,787,533 | * | 11/1988 | Hoskins | 229/918 |
| 5,377,857 | * | 1/1995 | Taravella et al. | 206/512 |
| 5,431,336 | * | 7/1995 | Clee | 229/918 |
| 5,687,902 | * | 11/1997 | Tusing et al. | 229/122.23 |

FOREIGN PATENT DOCUMENTS 3052184  7/1998 (JP) .

* cited by examiner

Primary Examiner—Gary E. Elkins
(74) Attorney, Agent, or Firm—Martin A. Farber

(57) ABSTRACT

A reusable assembled box and a method of transport thereof are provided, in that the box has a base with greater strength, and is capable of disassembled into compact pieces facilitating sending back thereof, thus reducing a transport cost and enabling reuse of the box in higher frequency. The box comprises a first member, a second member, and coupling members. The first member is in a substantially rectangular shape, comprises a base and a pair of opposing side walls folded up from the base. The second member is in a substantially rectangular shape and comprises a base, overlain on the base of the first member, in a shape substantially identical to that of the first member, and a pair of side walls adjacent to the walls of the first member. The coupling members detachably couples upper end corners of adjacent side walls of the first and second members assembled into a box by overlaying the bases of the first and second members. Thus the box can be easily assembled with a pair of board-like bases in a simple and substantially rectangular shape by overlaying the bases, thus realizing a base having greater strength, and enabling packing of heavy parts into the box, and when the box is reused, it can be disassembled into rectangular boards of a substantially the same shape and compactly piled up for sending back, thus transport cost can be reduced.

7 Claims, 4 Drawing Sheets

REUSABLE ASSEMBLED BOX AND METHOD OF TRANSPORT THEREOF

BACKGROUND OF THE INVENTION

1. Field of the Invention

The present invention relates to a reusable assembled box to be used, stacked in a container, for transport of parts.

2. Description of the Related Art

For transport of parts, particularly transport of parts to overseas in complete knocked-down (CKD) system, a method of transport employed is that a number of boxes packed with the parts are stacked in a container for transport, and as a box for packing each of the parts, conventionally, a general corrugated fiberboard box (which is in a prism shape and a base and a lid of the box are formed by folding back a lower and upper ends of the corrugated fiberboard respectively) is used.

With such corrugated fiberboard box, the box can hardly be reused after the transport, since at least the base thereof is protected against deflection by means of a gum tape or the like adhered thereto when the box is packed with the parts for transport.

Therefore, normally, the corrugated fiberboard box or the like once used is burned down or sent out as a material for making a recycled paper.

In the situation, a proposition is made for a simple assembling-type reusable box such as disclosed in Japanese Utility Model Application No. 10-2244 (Japanese Utility Model Registration No. 3052184) shown in FIGS. 3.

To make the simple assembling-type reusable box, a sheet of a board-like body is folded upright to form flaps 106, 107, and 108 to be side walls as shown in FIG. 3A, thus a hollow rectangular box as shown in FIG. 3B is formed, and then four corners of the box are coupled by box corners 130 to 133 respectively to form a packing box.

At each of the corners, as shown in FIG. 3C, protrusions 124 and 125 in the box corner are respectively inserted to grooves 141 and 142 provided on upper portions of the flaps to be mutually coupled for retaining the whole shape of the box.

Since there is an external edge 123 formed upright on upper edge of each of the box corners at a position slightly external thereto, respective assembling-type reusable boxes packed with the parts can be stacked in a container (not shown) as shown in FIG. 3D for transport.

With appearance of such an assembling-type reusable box, it becomes easier to reuse the box, however, in order to send back the box to the source of the parts while keeping the box in a reusable state, the box of the above-described conventional example still has a problem of a higher transport cost since the box has a larger area when extended.

Therefore, when the box is packed for sending back for reuse, it is forcibly folded into a smaller piece, thus a folded edge is damaged by an unreasonable folding force, in addition to a large amount of labor required in the folding work, causing a tendency that recycling frequency is decreased. Particularly, when a box needing a certain degree of depth is formed, the tendency is obvious. Furthermore, in such a conventional box, since the box is formed by assembling a sheet of board-like body having a large area, strength of a base thereof is limited, therefore it is customary to add the other board-like body to the base for reinforcement thereof, and as a result there issues also a risk of losing it during transport.

SUMMARY OF THE INVENTION

Accordingly, an object of the present invention is to provide a reusable assembled box having a base of higher strength, and capable of reducing transport cost by facilitating transport of once used box by disassembling the box into a compact piece, and of reusing the box in higher frequency, and a method of transport thereof, thus solving the problem of the above-described conventional assembling-type box.

Therefore, according to a first aspect of the present invention, a reusable assembled box is characterized by comprising a first member in a substantially rectangular shape forming a base and a pair of opposing side walls folded up from the base, a second member in a substantially rectangular shape provided with a base, overlain on the base of the first member, in a shape substantially identical to that of the first member and forming a pair of side walls adjacent to the walls of the first member, and coupling members for detachably coupling each other upper end corners of adjacent side walls of the first and second members assembled into a box-like form by overlaying the bases thereof to each other.

According to a second aspect of the present invention, the reusable assembled box is characterized by being provided with recessed edges substantially equal to the thickness of the side walls of the first member on opposing sides of the base of the second member which have no side walls.

According to a third aspect of the present invention, the reusable assembled box is provided with an engaging portion for engaging joining edges of the adjacent side walls to each other.

According to a fourth aspect of the present invention, the engaging portion is composed of a step-like recessed and protruded portion for meshing with one of an adjacent engaging portion each other.

According to a fifth aspect of the present invention, the reusable assembled box is characterized by having grips formed on side walls of at least the first member.

According to a sixth aspect of the present invention, the reusable assembled box, comprising a first member in a substantially rectangular shape forming a base and a pair of opposing side walls folded up from the base, a second member in a substantially rectangular shape provided with a base, overlain on the base of the first member, in a shape substantially identical to that of the first member and forming a pair of side walls adjacent to the side walls of the first member, and coupling members for detachably coupling upper end corners of adjacent side walls of the first and second members assembled into a box by overlaying the bases each other, is characterized in that, after being transported elsewhere as a transport box, the coupling members are removed from the first and second members, and the first and second members are then expanded and mutually piled up to be sent back to the source.

According to a seventh aspect of the present invention, the reusable assembled box, comprising a first member in a substantially rectangular shape forming a substantially square base and a pair of opposing side walls folded up from the base, a second member in a substantially rectangular shape provided with a base, overlain on the base of the first member, in a shape substantially identical to that of the first member and forming a pair of side walls adjacent to the side walls of the first member, and coupling members for detachably coupling upper end corners of adjacent side walls of the first and second members assembled into a box by overlaying the bases each other, is characterized in that, after being transported elsewhere as a transport box, the coupling members are removed from the first and second members, and the first and second members in substantially the identical shape are then expanded and mutually piled up in the same direction to be sent back to the source. These aspects are made as means to solve the above-described problems.

BRIEF DESCRIPTION OF THE DRAWINGS

These and other objects and advantages of the present invention will become clear from the following description with reference to the accompanying drawings, wherein:

FIG. 1A is an exploded perspective view of a reusable assembled box in an assembling state, and FIG. 1B is a perspective view of the reusable assembled box when completely assembled;

FIG. 2A shows an expanded plan view of respective forming members of a modified example of the reusable assembled box with a deep base, and FIG. 2B is a plan view showing the reusable assembled box in a state immediately before assembling.

DETAILED DESCRIPTION OF THE PREFERRED EMBODIMENT

A reusable assembled box and a method of transport thereof according to the present invention are hereunder described with reference to the drawings.

Figure 1A:
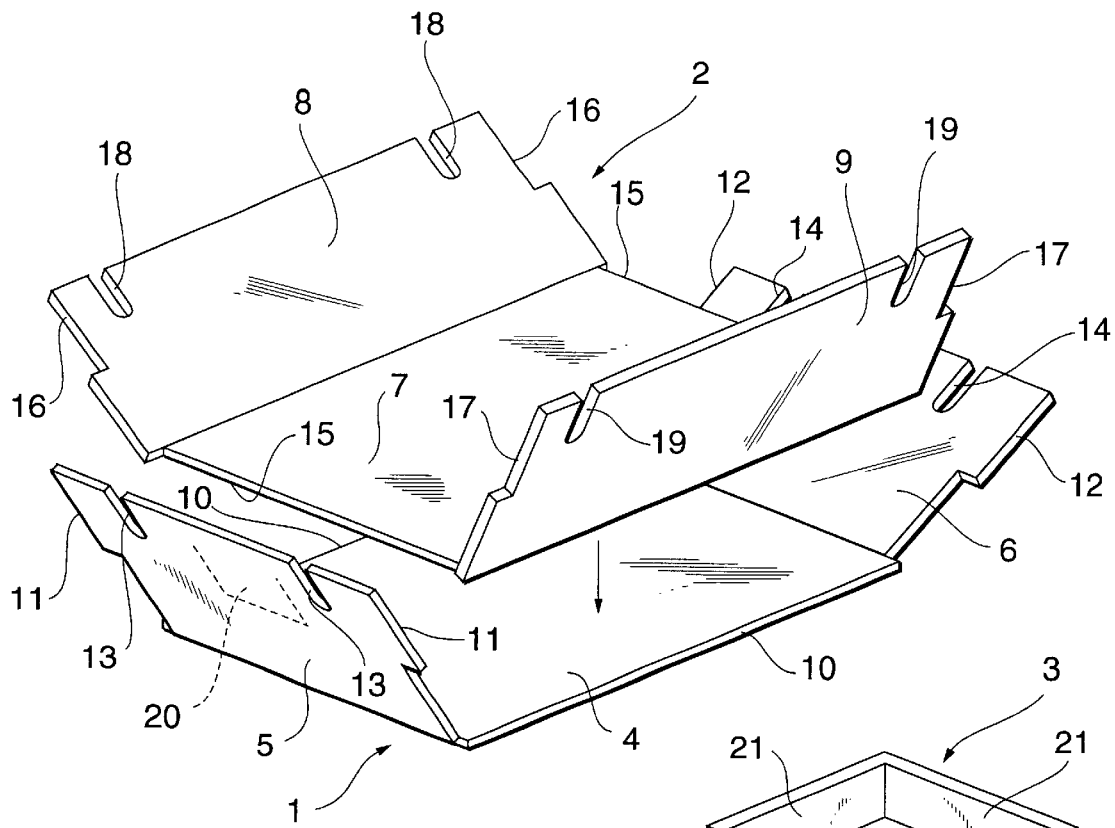
FIGS. 1A and 1B show an embodiment of a reusable assembled box and method of transport thereof according to the present invention.
Figure 1B:
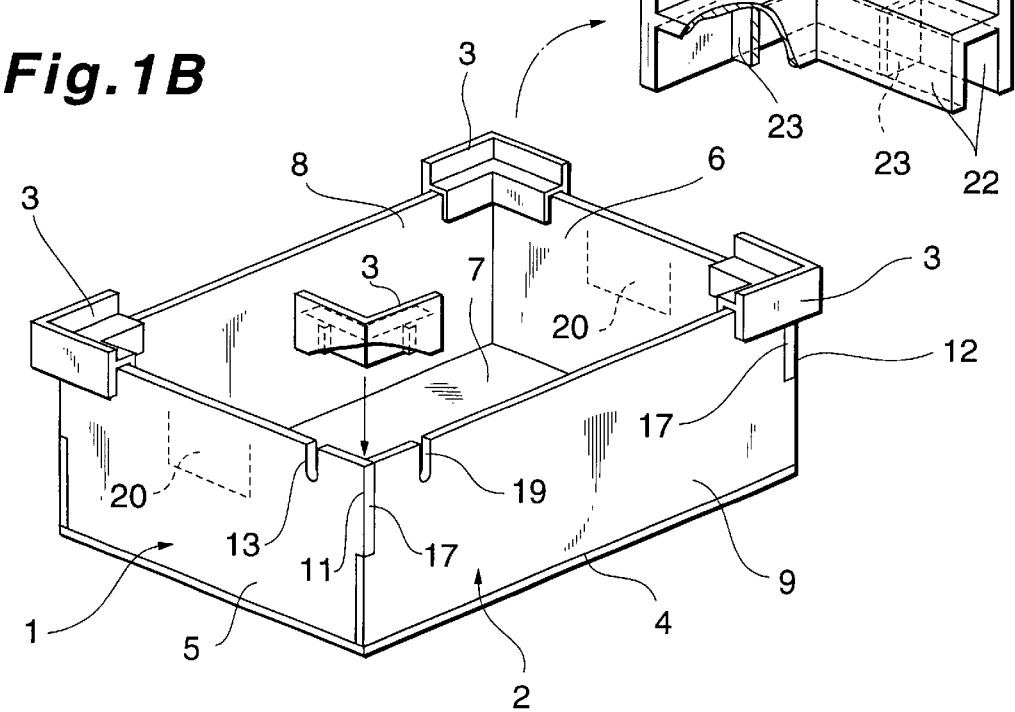
Figure 2A:
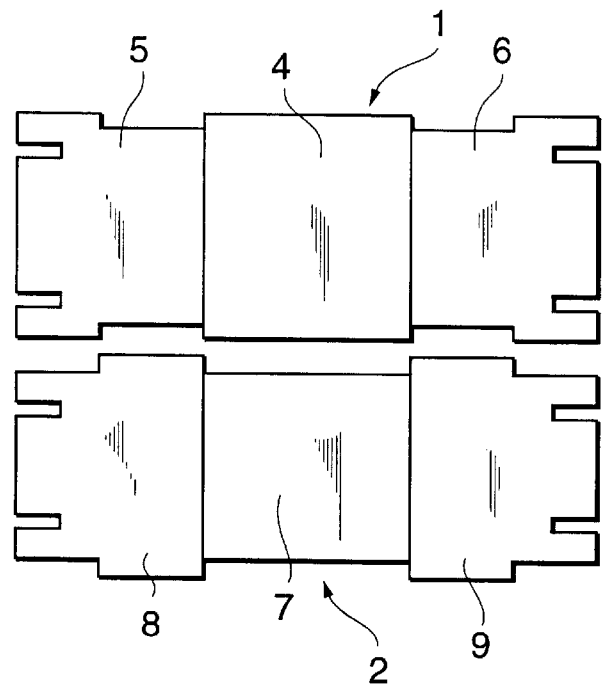
FIGS. 2A and 2B show another embodiment of a reusable assembled box and method of transport thereof according to the present invention.
Figure 2B:
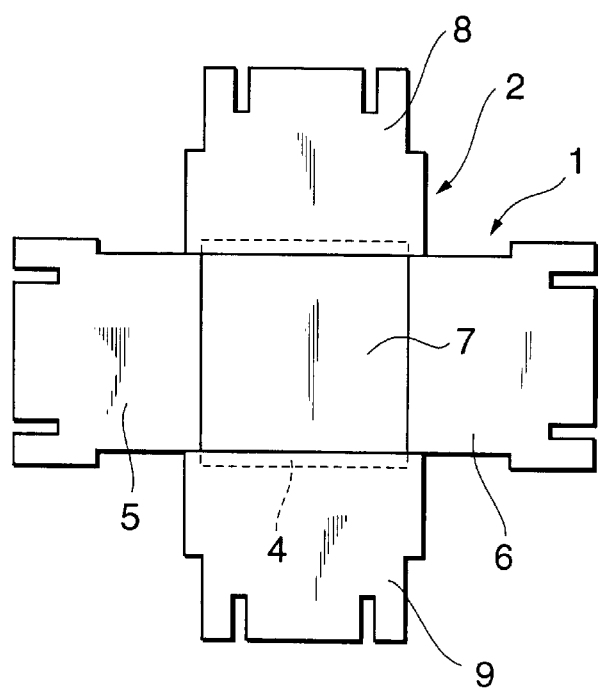
Figure 3A:
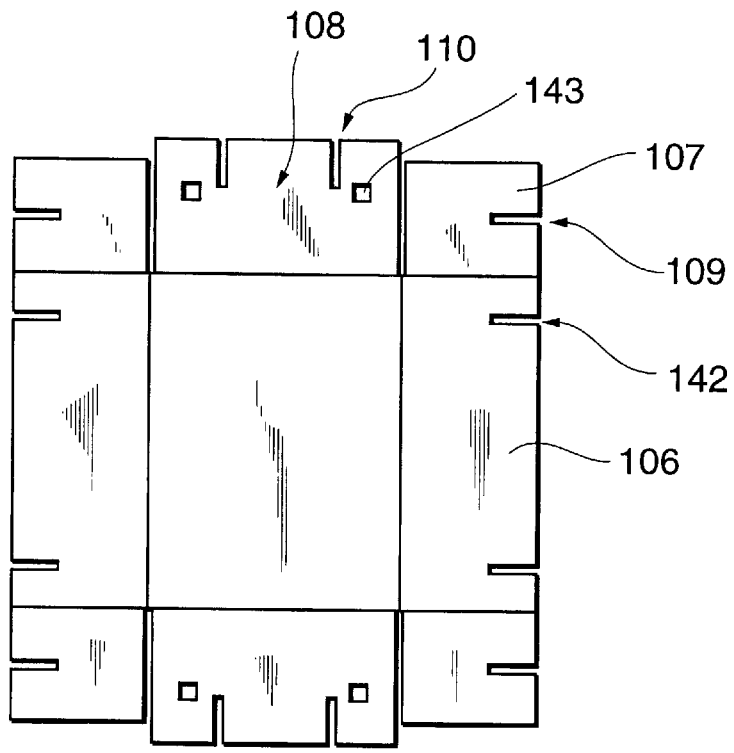
FIGS. 3A, 3B. 3C, and 3D are explanatory views showing a conventional simple assembling-type reusable box.
Figure 3B:
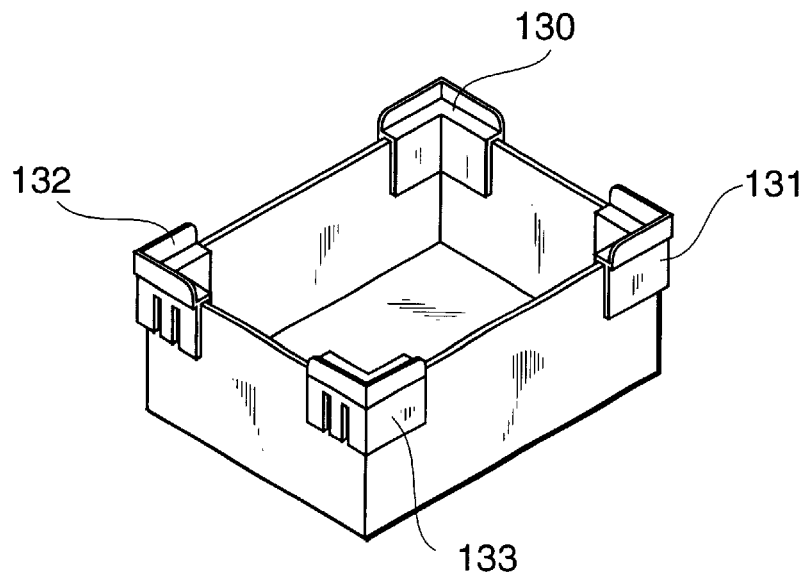
Figure 3C:
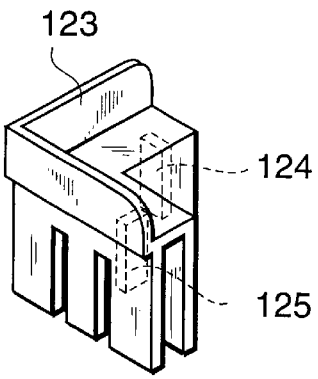
Figure 3C:
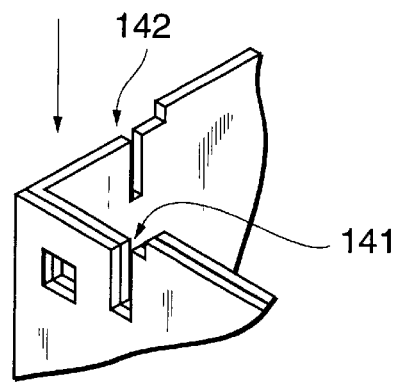
Figure 3D:
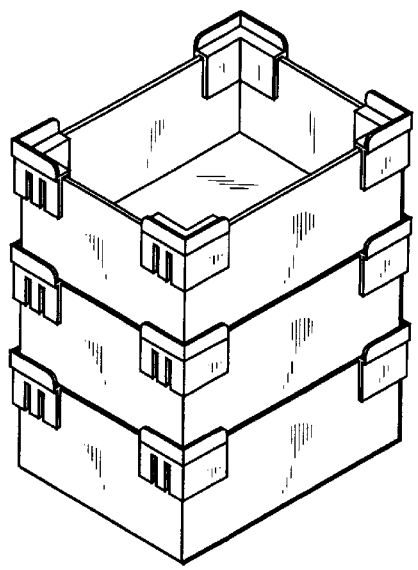

FIGS. 1A and 1B and FIGS. 2A and 2B show an embodiment of a reusable assembled box and method of transport thereof according to the present invention, and FIG. 1A is an exploded perspective view of a reusable assembled box in an assembling state, FIG. 1B is a perspective view of the reusable assembled box when completely assembled, FIG. 2A shows an expanded plan view of respective forming members of a modified example of the reusable assembled box with a deep base, and FIG. 2B shows a plan view of the reusable assembled box in a state immediately before assembling.

As shown in FIG. 1A, a reusable assembled box according to the present invention is characterized by comprising a first member 1, a second member 2 and coupling members 3. The first member 1 is in a substantially rectangular shape forming a base 4 and a pair of opposing side walls 5 and 6 folded up from the base 4. The second member 2 also is in a substantially rectangular shape provided with a base 7 in a shape substantially identical to that of the base 4 of the first member 1 and forming a pair of side walls 8 and 9 adjacent to the pair of the side walls 5 and 6 of the first member. The base 4 of the first member 1 is overlain by the base 7 of the second member 2 to assemble a box. The coupling members 3 are provided for detachably coupling each other of each pair of upper end corners of adjacent side walls 5 and 8, 5 and 9, 6 and 8, and 6 and 9 of the box, as shown in FIG. 1B.

In the present embodiment, both sides of the base 7 of the second member 2 are provided with recessed edges 15 recessed by a portion substantially equal to the thickness of the side walls 5 and 6 of the first member, thereby adjacent joining edges of the side walls of the assembled box are closely contacted. For reference, if the box need not be assembled with high precision, the recessed edges 15 are not necessary.

Further, both sides of the base 4 of the first member 1, which is on the lower side of a double base formed with the base 7 of the second member 2, corresponding to the side walls 8 and 9 of the second member 2, are provided with protruded edges 10 which are protruded by a portion substantially equal to the thickness of the side walls 8 and 9 of the second member 2. The protruded edges 10 securely hold the side walls 8 and 9 of the second member 2 thereon.

Furthermore, each of pairs of the joining edges of side walls 5 and 8, 5 and 9, 6 and 8, and 6 and 9 has an engaging portion therebetween.

In the present embodiment, as shown in FIGS. 1A and 1B, first engaging protrusions 11 and second engaging protrusions 12 of the upper portions of the side walls 5 and 6 of the first member 1 are formed by indenting lower portions of the joining edges of the side walls 5 and 6 by a portion equal to the thickness of the side walls 8 and 9. First engaging recesses 16 and second engaging recesses 17 of the upper portions of the side walls 8 an 9 of the second member are formed by making protrusions for engaging with the recesses of the side walls of the first member 1 at the lower portions of the joining edges of the side walls 8 and 9. Each of engaging protrusions 11,12 and each of engaging recesses 16,17 are meshed each other to form step-shaped engagements, respectively.

By these step-shaped engagements, the adjacent side walls can be prevented from deflecting and opening in the vertical direction therebetween. For reference, the step-shaped engagements may be provided in a plurality, and the mode of the engagement between the joining edges of the side walls is not limited to step-shaped, and the engagement of any suitable modes may be employed.

Each of adjacent side walls at respective upper corners of a box thus assembled is mutually coupled by a detachable coupling member 3.

The coupling member 3 may be composed of a resin integrally formed, or a paper or reinforced paper material of a quality same as that of the first and second members 1 and 2. The coupling member 3 is substantially L-shaped in a plan view, and has a receiving portion 22 comprising a pair of opposing dangled pieces formed on the lower side thereof to receive the side walls, and has a stacking flange 21 formed on the upper side thereof, as shown in FIG. 1B.

An interval between the pair of the dangled pieces of the receiving portion 22 is made substantially the same as the thickness of the side walls of the first and second members 1 and 2.

Stopper joint pieces 23 are formed, extending downwardly, on both sides of a corner so as to reinforce the dangled pieces and securely connect therebetween. The stopper joint pieces 23 are inserted, for coupling, into first to fourth slits 13, 14, 18, and 19 provided in the vicinity of respective corners at both sides of the upper end of each of the side walls 5, 6, 8, and 9 of the first and second members 1 and 2, thus the side walls assembled into a box are mutually combined and retained.

The stacking flange 21 formed on the upper portion of the receiving portion 22 is formed upright on the same plane as the external side of the dangled piece of the receiving portion 22, and is to securely hold the base of a box stacked thereabove when a number of assembled boxes are stacked. However, depending on a mode of stacking (for example, when boxes are stacked with a long board-like body horizontally intervened between upper and lower boxes), the stacking flange 21 may be omitted. It should be noted that a slight recess for accommodating the coupling member 3 may be formed on both upper ends of each of the side walls such that the upper planes of the side walls 5, 6, 8, and 9 level with the upper planes of the receiving portions 22 of the coupling members 3 after being assembled.

Grips 20 are respectively formed on the side walls 5 and 6 of at least the first member 1, having the base 4 thereof arranged at the lowest of the box. By this arrangement, when a box is lifted using the grips, total load is burdened by the first member 1 having the base 4 thereof arranged at the lowest of the box, thus the box can be used with higher durability. Depending on requirement, the grips may be formed on the side walls 8 and 9 of the second member 2. In this case, the load is burdened by engaging portions formed between joining edges of each of the side walls, thus the durability of the engaging portions need to be improved. Sites for the grips 20 may be previously bored of sewing holes so as to be punched to form the grips when they are first used, and also a variety of suitable modes may be employed therefor.

Hereunder, a method of transport of a reusable assembled box according to the present invention is described.

The reusable assembled box constructed as above-described is used in a state as assembled into a box in the same manner as a conventional packing box. Namely, the reusable assembled box is packed with parts, and stacked in a container for transporting the parts.

The reusable assembled box used for the transport of the parts is, after the parts are taken out therefrom at a destination, removed of the coupling members 3, and the first member 1 and second member 2 are respectively extended in a flat board form, respectively piled up, and loaded into a container for sending back.

Some of the reusable assembled boxes used for the transport of the parts are kept assembled as the box, without being disassembled, for packing the removed coupling members 3 to be sent back together with the piled up first members 1 and the second members 2.

FIGS. 2A and 2B show a modified example of the reusable assembled box with a deep base, and FIG. 2A is expanded plan views respectively showing the first and second members and FIG. 2B is a plan view showing the reusable assembled box in a state immediately before assembling.

As shown in FIG. 2A. a first member 1 is in a substantially rectangular shape and comprises a base 4 in a substantially square shape and a pair of opposing side walls 5 and 6 in a substantially rectangular shape folded up from the base 4, and a second member 2 is in a shape substantially the same as the first member. As shown in FIG. 2B, the first member 1 is orthogonally overlain by the second member 2, the base 7 is laid on the base 4, and each of side walls 5, 6, 8, and 9 are folded upright, thus a box is assembled as shown in FIG. 1B.

In the present modified example, the bases and the side walls are in substantially rectangular shapes and assembled into a box with a deep base. However, even with the box having the deep base, the first member 1 and the second member 2 can be easily separated when the box is disassembled, and there is no trouble of folding the members after the use as experienced with the conventional box.

The reusable assembled box of the modified example with the deep base is also sent back after the use for the next transport of parts in the same way as the example described previously. Furthermore, as shown in the modified example with the deep base, since the base is structured in a substantially square shape, the first member 1 and the second member 2 are in substantially identical shape, thus the first member 1 and the second member 2 can be piled up together, thus increasing freedom in packing for sending back.

Although description has been made of the embodiments of the present invention, a shape and material (plastic may be used) of the first and second members, a shape and material of the coupling members, a mode of coupling the side walls in the first and second coupling members, a shape and mode of engagement (not only step-shaped, but also engagement by tongues formed by extending the side walls, employment of engaging tools of separate members or the like, number of step-like engaging portions) at the joining edges of each of the side walls, a shape and type of the grips, and the like, can be suitably selected within the scope of the gist of the present invention.

As described above in detail, a reusable assembled box according to the present invention comprises a first member, a second member, and coupling members. The first member is in a substantially rectangular shape, and comprises a base and a pair of opposing side walls folded up from the base. The second member comprises a base, overlain on the base of the first member, and in a shape substantially identical to that of the first member, and a pair of side walls adjacent to the walls of the first member. The coupling member detachably couples upper end corners of adjacent side walls of the first and second members, which are assembled into a box by placing the base of the first member under the base of the second member. A reusable assembled box thus structured has a mutually overlain pair of board-like bases in a simple and substantially rectangular shape, is facilitated of assembling and disassembling per se, and realizes a base having greater strength, thereby enabling packing of fairly heavy parts into the box even if it is structured with a board-like body made of a paper, for example, a corrugated fiberboard, or the like.

Further, when recessed edges substantially the same as the thickness of the side walls of the first member are provided on both sides of the base of the second member, adjacent joining edges at the base of the side walls of the assembled box are closely contacted, thereby the box as a vessel can be made more airtight.

Furthermore, when joining edges of the adjacent side walls are engaged each other to form an engagement, deflecting to each other in the vertical direction of the adjacent joining edges of the assembled side walls and opening between the side walls can be effectively prevented from occurring, and in addition a certain degree of load in the vertical direction can be burdened by the engagement.

Moreover, when the engagement is formed by stepped sides meshing each other, the first member and the second member can be assembled into a box with higher precision, and deflecting each other in the vertical direction of the adjacent joining edges of the side walls and opening between the side walls can be effectively and securely prevented from occurring, only by providing the stepped sides by cutting a portion equal to the thickness of respective side walls.

Further, when grips are formed on the side walls of at least the first member, total load of the box is burdened by the first member when it is lifted by the grips, having the base thereof arranged at the lowest of the box, thus the box can be used with higher durability.

Furthermore, after a reusable assembled box comprising a first member, a second member, and coupling members, in which the first member is in a substantially rectangular shape and comprises a base and a pair of opposing side walls folded up from the base, and the second member is also in a substantially rectangular shape and comprises a base, overlain on the base of the first member, and in a shape substantially identical to that of the first member, and a pair of side walls adjacent to the side walls of the first member, and the coupling members detachably couple upper corners of adjacent side walls of the assembled box formed by placing the base of the second member on the base of the first member. is transported as a transport box, the coupling members are removed from the assembled box to disassemble the first member and the second member, the first and second members are then extended and respectively piled up, or the first and second members are piled up together for sending back. In this way, by structuring a reusable assembled box by easily assembling a pair of board-like bases in a simple and substantially rectangular form by overlaying the base of the second member on the base of the first member, a base of greater strength is realized, enabling packing of heavy parts thereinto for transport. When the reusable assembled box is reused after the transport of the parts, it can be disassembled to rectangular board-like bodies of substantially the identical shape for compactly piling up for sending back, thus a transport cost can be reduced.

Moreover, since the reusable assembled box comprises a plurality of independent members, namely the first member and the second member, even if a part of the assembled box is damaged, the damage can be repaired by replacing a member of only one side, thus operation cost can be reduced.

In this way, according to the present invention, a reusable assembled box and method of transport thereof are provided, in which the reusable assembled box has a base with greater strength, and facilitates transport by being disassembled into compact pieces, thus enabling reduction in transport cost and reuse per se in higher frequency.

While the invention has been described in conjunction with preferred specific embodiment thereof, it will be understood that this description is intended to illustrate and not limit the scope of the invention, which is defined by the following claims.

What is claimed is:

1. A reusable assembled box comprising:
    a first member in a substantially rectangular shape forming a base and a pair of opposing side walls folded up from said base;
    a second member in a substantially rectangular shape provided with a base in a shape substantially identical to that of said first member and forming a pair of side walls adjacent to the side walls of said first member; and
    coupling members for detachably coupling upper end corners of adjacent side walls of said first and second members assembled into a box-like form by overlaying the bases.

2. The reusable assembled box according to claim 1, wherein
    recessed edges substantially equal to the thickness of the side walls of said first member are provided on opposing sides of the base of said second member which have no side walls.

3. The reusable assembled box according to claim 1, further comprising:
    an engaging portion formed for engaging joining edges of the adjacent side walls to each other.

4. The reusable assembled box according to 3, wherein
    said engaging portion is composed of a step-like recessed and protruded portion for meshing with one of an adjacent engaging portion each other.

5. The reusable assembled box according to claim 1, wherein
    grips are formed on side walls of at least the first member.

6. A method of transport of a reusable assembled box, said reusable assembled box comprising:
    a first member in a substantially rectangular shape forming a base and a pair of opposing side walls folded up from said base;
    a second member in a substantially rectangular shape provided with a base, overlain on the base of said first member, in a shape substantially identical to that of said first member and forming a pair of side walls adjacent to the side walls of said first member; and
    coupling members for detachably coupling upper end corners of adjacent side walls of said first and second members assembled into a box by overlaying the bases each other;
    wherein, after said reusable assembled box is transported as a transport box, said coupling member is removed from said assembled box to have said first and second members disassembled for extension, and said extended first and second members are respectively piled up for sending back.

7. A method of transport of a reusable assembled box, the reusable assembled box comprising:
    a first member in a substantially rectangular shape forming a substantially square base and a pair of opposing side walls folded up from said base;
    a second member in a substantially rectangular shape provided with a base, overlain on the base of said first member, in a shape substantially identical to that of said first member and forming a pair of side walls adjacent to the side walls of said first member; and
    coupling members for detachably coupling upper end corners of adjacent side walls of said first and second members assembled into a box by overlaying the bases each other;
    wherein, after said reusable assembled box is transported as a transport box, said coupling member is removed from said reusable assembled box to have said first and second members disassembled for extension, and said extended first and second members of substantially identical shape are piled up in the same direction for sending back.

* * * * *